United States Patent [19]

Sundell et al.

[11] Patent Number: 4,858,118
[45] Date of Patent: Aug. 15, 1989

[54] METHOD AND APPARATUS FOR DETERMINING IN A COMPUTER WHICH OF A NUMBER OF PROGRAMS ARE ALLOWED TO UTILIZE A RAPID ACCESS MEMORY

[75] Inventors: Hans E. Sundell, Stockholm; Terje Egeland, Älvsjö; Sten E. Johnson, Huddinge; Erik B. Friman, Stockholm, all of Sweden

[73] Assignee: Telefonaktiebolaget L M. Ericsson, Stockholm, Sweden

[21] Appl. No.: 55,317

[22] Filed: May 29, 1987

[30] Foreign Application Priority Data

Jun. 26, 1986 [SE] Sweden .................. 8602858

[51] Int. Cl.⁴ .................. G06F 12/06; G06F 13/00
[52] U.S. Cl. .................. 364/243.4; 364/246.1; 364/964.2; 364/966.6
[58] Field of Search .................. 364/200, 900

[56] References Cited

U.S. PATENT DOCUMENTS

| | | | |
|---|---|---|---|
| 3,218,611 | 11/1965 | Kilburn et al. | 364/200 |
| 3,292,153 | 12/1966 | Barton et al. | 364/200 |
| 3,588,839 | 6/1971 | Belady et al. | 364/200 |
| 3,949,378 | 4/1976 | Crabb et al. | 364/200 |
| 4,035,778 | 7/1977 | Ghanem | 364/200 |
| 4,078,254 | 3/1978 | Beausoleil et al. | 364/900 |
| 4,453,230 | 6/1984 | Mizoguchi et al. | 364/900 |
| 4,601,009 | 7/1986 | Kogawa et al. | 364/900 |

*Primary Examiner*—Felix D. Gruber
*Attorney, Agent, or Firm*—Burns, Doane, Swecker & Mathis

[57] ABSTRACT

A method and apparatus for determining what program shall utilize a rapid access memory in a computer working with a plurality of programs and having a conventional slow access (NM) memory and a rapid access memory (CM), characterized in that during a test period there is registered for each program the number of instructions in the program requiring access to the memory, this number being divided by the whole memory space required by a program, the quotients formed after each other in this way being compared with each other and for the program with the highest quotient the memory content is transferred from the slow access memory to the rapid access memory. For each program there is registered with the aid of a counter (RF) the number of instructions requiring access to the slow access memory (NM). This number is divided with the aid of a measuring circuit (R1, R2, JR, KB) by the entire memory space for the respective program noted in a space memory (SM). For the program with the highest quotient the memory content is transferred from the relatively slow access memory (NM) to the rapid access memory (CM). An address memory (AM) is arranged, and for the program information transferred from the slow access memory (NM) to the rapid access memory (CM) the address memory reads out the starting address of the program information in the rapid access memory (CM) on addressing a starting address in the slow access memory (NM).

2 Claims, 1 Drawing Sheet

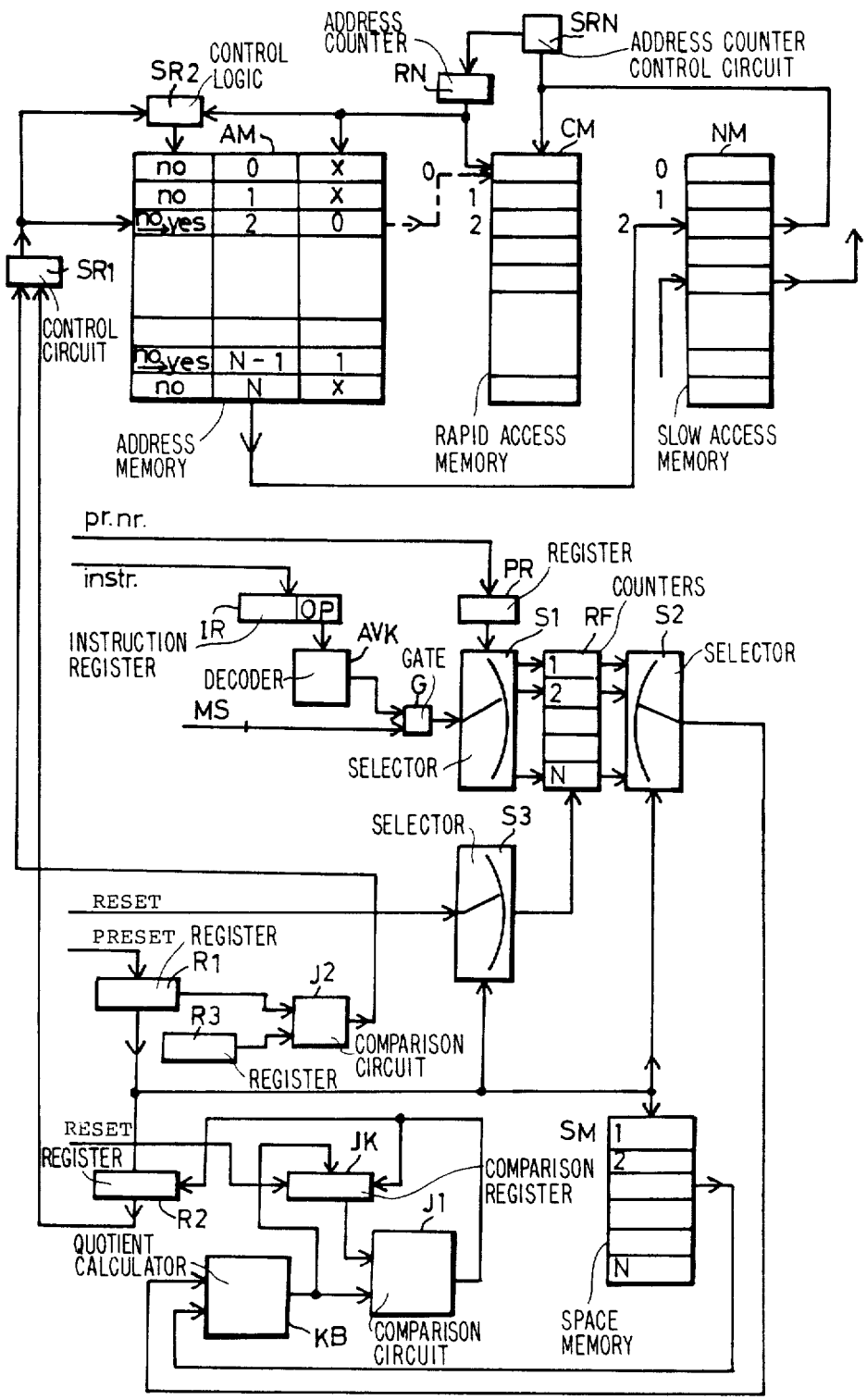

METHOD AND APPARATUS FOR DETERMINING IN A COMPUTER WHICH OF A NUMBER OF PROGRAMS ARE ALLOWED TO UTILIZE A RAPID ACCESS MEMORY

TECHNICAL FIELD

The invention relates to a method of determining what programme shall utilise a rapid access memory in a computer working with a plurality of programmes and having a conventional slow access memory and a rapid access memory, where the latter is only allowed to be utilised, for reasons of cost, by data processing instructions requiring rapid access. The invention also relates to an apparatus for carrying out the method.

BACKGROUND ART

In computers, the utilisation of access often takes places to a few given memory addresses in comparison to remaining memory addresses. If the access time for thse given memory addresses is made as short as possible, the importance of the access time for the remaining memory addresses is reduced. Since this information accesible by means of these often used addresses are stored in a high speed buffer store or so-called "cache", the importance of memory access time is decreased. A condition for this is however that there is great probability that the sought-after information is in the rapid access memory. For every access not leading to data in the cache the sought-for data is written into the cache in the conventional solutions. This conventional method is usable if most of the accesses are to some few memory addresses or there is repeated access to a limited number of addresses, the limitation being determined by the size of the cache. If the mentioned limitations are not applicable, the cache will often lack the sought-after information, since new information has already been written into the cache. Thus, when access is attempted to some previously written-in information, it may have already been removed, and the cache contains mostly inappropriate information. The use of a conventional cache is described in Motorola's MC 68020 32-bit Microprocessor Uses's Manual, for example.

DISCLOSURE OF INVENTION

The mentioned drawbacks are eliminated by the invention in a way such that statistics are made up at selected occassions for the accesses in respect of the occurrence frequency of the addresses, and the rapid access memory is charged with the previous measuring period's most often sought information, so that the rapid access memory can be utilised optimally.

BRIEF DESCRIPTION OF DRAWING

The invention will now be described in detail with the aid of an embodiment and with reference to the accompanying drawing illustrating an apparatus for continuous statistic control of the accesses most often occuring.

BEST MODE FOR CARRYING OUT THE INVENTION

The Figure illustrates in the form of a block diagram an apparatus for statistic processing of the programmes containing the greatest proportion of instructions requiring rapid access, so that selecting the programmes entitled to use a rapid access memory is enabled.

In their operation part the instructions are marked in such a way that a first category A and a second category B can be distinguished, category A giving access to a slow access memory NM where it is desired to decrease the access time with the aid of a rapid access memory CM, and category B which does not give access to the slow access memory NM but meaning other functions.

When instructions in a programme begin to be executed, a number identifying the programme is written into a first register PR simultaneously as an instruction register IR is successively charged in a conventional manner with the instructions included in the programme. The instructions' operation part OP is decoded in a decoder AVK, and if the instruction was of category A the output of the decoder is activated. The register PR activates a first counter RF1, RF2 etc, corresponding to the programme number such that a selector S1 takes the output signal of the decoder AVK as a counter signal to a counter, e.g. the counter RF1, so that it is stepped forward one step for each instruction of the category A. However, this counter signal can only occur when a gate G is activated by a measuring period signal MS occuring during a measuring period. The selecter S1 is set for the next programme number to the first counter, e.g. RF2, corresponding to the programme number. Evaluation can be started when the measuring period is terminated. Evaluation takes place such that the programme numbers are written in order into a second register R1, and with the written programme number as addressed, the content of the respective counter RF is read out, as well as a space memory SM containing the value of the memory area size associated with the respective programme. These two values, i.e. the counter setting and the size of the slow access memory area associated with the programme are fed to quotient calculator KB where the former value is divided by the latter value. The result of the quotient calculation is fed to a first comparison circuit J1, where it is compared with a value obtained from a comparison register JK, this value giving the result of a previous quotient calculation. In addition, the result of the quotient calculation is fed to the comparison register JK where the previously written-in value is replaced with the new value, should the comparison in the comparison circuit J1 have shown that the new result is greater than the previous value. If the result is less than, or equal to the previous value, the value in the second register is increased by one for measuring the values of the subsequent programme. On the other hand, if an increase of the value has taken place in the comparison register JK, the content of the second register R1 is transferred to a third register R2, whereupon the value of the register R1 is increased by one, to measure values of the subsequent programme.

The sequence is repeated until all programmes have been processed in this way, after which the number of the programme having the greatest quotient and thus having the greatest right to use the rapid access memory CM will be written into the register R2. The information to the programme corresponding to the number in the register R2 is copied from the slow access memory NM to the raid access memory CM. This will first take place when all the programmes have been processed. A fourth register R3 is arranged for this purpose and contains the highest programme number to be processed. When the contents in the registers R1 and R3 have been compared in a second comparison circuit J2 and have been found to be equal, the content in the register R2 can address the initial address via the first control circuit SR1 to the information of a programme in the slow access memory NM via an address memory AM, which is indicated by a connection between column 2 in the address memory AM and the slow access memory NM. It is then noted in the address memory AM that the information is in the rapid access memory CM and at what address. Initially, the address memory AM only contains the information starting address in the memory NM, where all information is written-in originally. Furthermore, there is room in the address memory AM for noting whether the rapid access memory CM is used, and room for giving, in this case, the information starting address in the memory CM. When the starting address of the most entitled programme has been addressed via the address memory AM, the information is transferred to the first unoccupied address in the rapid access memory CM which is identified by a second counter RN. The counter RN is stepped forward one step by a second control circuit SRN, which is energised each time transfer of information takes place from the slow access memory NM to the rapid access memory CM.

According to the embodiment, the programme which had information stored from, and with the address number 2, in the slow access memory NM was the first entitled to utilise the rapid access memory CM, and the second counter RN has identified the address 0 in the rapid access memory CM simultaneously as it has written in the address in the third column in the address memory AM. It shall now also be noted in the memory AM that the rapid access memory is to be used instead of the slow access one. Preferably, this may be done by changing "NO" in the first column to "YES". In practice, this may be achieved by replacing a "0" by a "1", for example. A control logic SR2 is used for this purpose, and carries out the change from "0" to "1" when it obtains both the address from the first control circuit SR1 and the signal from the second counter RN as a sign that the address in the rapid access memory CM has been written into the address memory AM.

When the information of the most entitled programme has been written into the rapid access memory CM and address and notation has been written into the address memory AM, the second register R1 is reset to 0 and the most entitled programme counter RF is reset to 0 via a selecter S3, after which the quotient comparison is repeated to obtain the next highest quotient.

Subsequent hereto the sequence with copying into the rapid access memory CM and storing of adress and notation in the address memory AM etc is repeated. When the information in the programme with the second highest quotient has been written into the rapid access memory CM and address and notation have been stored in the address memory AM the second register R1 and this programme's counter RF is reset to 0 via the selector 3. Thereafter the quotient comparison, copying, into the rapid access memory etc is repeated until the rapid access memory is filled. By the measuring periods being repeated successively with a correponding regrouping, the rapid access memory is utilised optimally.

We claim:

1. A method for controlling utilization of a rapid access memory in a computer system having both a slow access memory and a rapid access memory, said slow access memory storing a plurality of computer programs having instructions for controlling said computer system; comprising the steps of:

determining for each program the number of instructions contained in the respective program that require access to memory during execution;

dividing the number of program instructions that require access to memory during execution by a value indicating the total amount of memory space required by the respective program to determine a quotient for each program;

comparing the quotients for each program with one another;

transferring the program with the highest quotient from the slow access memory to the rapid access memory; and successively filling any remaining space in the rapid access memory with the programs having the next highest quotients.

2. Apparatus for determining which of a plurality of programs should utilize a rapid access memory in a computer having a slow access memory and a rapid access memory, comprising:

an instruction register containing program instructions;

a decoder for determining whether an instruction stored in said register requires access to memory;

a counter for counting the number of instructions in a program which require access to memory;

a memory field containing information regarding the total amount of memory required for all instructions of a given program;

a measuring circuit responsive to said counter and said memory field for determining a quotient for each program;

means for selecting the program having the highest quotient, and transferring it from the slow access memory to the rapid access memory; and an address memory for storing an indication that the program with the highest quotient is stored in the rapid access memory and the starting address for the program in the rapid access memory.

* * * * *